United States Patent
Barzegari et al.

(10) Patent No.: US 11,046,057 B2
(45) Date of Patent: Jun. 29, 2021

(54) ARTICLES MADE FROM LIPOPHILIC-RICH CELLULOSIC MATERIAL AND METHODS THEREFOR

(71) Applicant: MASONITE CORPORATION, Tampa, FL (US)

(72) Inventors: Mohamad Reza Barzegari, St. Charles, IL (US); James P. Pfau, Kirkland, IL (US); Bei-Hong Liang, Naperville, IL (US)

(73) Assignee: Masonite Corporation, Tampa, FL (US)

( * ) Notice: Subject to any disclaimer, the term of this patent is extended or adjusted under 35 U.S.C. 154(b) by 160 days.

(21) Appl. No.: 16/182,815

(22) Filed: Nov. 7, 2018

(65) Prior Publication Data

US 2019/0136015 A1 May 9, 2019

Related U.S. Application Data

(60) Provisional application No. 62/582,560, filed on Nov. 7, 2017.

(51) Int. Cl.
*C08L 1/02* (2006.01)
*C08J 5/24* (2006.01)
(Continued)

(52) U.S. Cl.
CPC ............ *B32B 21/13* (2013.01); *B32B 23/044* (2013.01); *C08J 5/24* (2013.01); *C08J 7/0427* (2020.01); *C08L 1/02* (2013.01); *C08L 97/02* (2013.01); *C09J 161/06* (2013.01); *C09J 161/24* (2013.01); *C09J 161/30* (2013.01); *C08J 2301/02* (2013.01); *C08J 2429/14* (2013.01); *C08J 2433/04* (2013.01); *C08J 2461/24* (2013.01);
(Continued)

(58) Field of Classification Search
CPC . C08J 5/24; C08J 7/047; C08J 2301/02; C08J 2461/24; C08J 2205/16; C08J 2479/08; C08J 2479/02; C08J 2429/14; C08J 2433/04; C08L 1/02; C08L 2205/03
See application file for complete search history.

(56) References Cited

U.S. PATENT DOCUMENTS

| | | |
|---|---|---|
| 4,726,881 A | 2/1988 | Schultz |
| 5,543,234 A | 8/1996 | Lynch et al. |

(Continued)

FOREIGN PATENT DOCUMENTS

| | | |
|---|---|---|
| WO | WO9738833 A1 | 10/1997 |
| WO | WO2012018934 A1 | 2/2012 |

(Continued)

OTHER PUBLICATIONS

Pinto et al., Journal of Agricultural and Food Chemistry 2005, 53, 7856-7862.

*Primary Examiner* — Robert D Harlan
(74) *Attorney, Agent, or Firm* — Berenato & White, LLC

(57) ABSTRACT

The invention relates to systems and techniques for manufacturing articles containing cellulosic material, a tackifier, and a binder, and related processes of making and using the cellulosic articles. In particularly exemplary embodiments, the manufactured articles are door skins, sometimes known as door facings, and doors made from the door skins. The article contains a lipophilic cellulosic material, a tackifier, and a binder.

21 Claims, 9 Drawing Sheets

(51) Int. Cl.
   *C08J 7/04*     (2020.01)
   *B32B 21/13*    (2006.01)
   *C08L 97/02*    (2006.01)
   *B32B 23/04*    (2006.01)
   *C09J 161/30*   (2006.01)
   *C09J 161/24*   (2006.01)
   *C09J 161/06*   (2006.01)
   *E06B 3/70*     (2006.01)

(52) U.S. Cl.
   CPC ........ *C08J 2479/02* (2013.01); *C08J 2479/08* (2013.01); *C08L 2205/03* (2013.01); *C08L 2205/16* (2013.01); *E06B 2003/7049* (2013.01)

(56) References Cited

U.S. PATENT DOCUMENTS

| | | | |
|---|---|---|---|
| 6,524,504 | B2 | 2/2003 | Vaders |
| 2004/0220299 | A1* | 11/2004 | Drabeck, Jr. ........... C08L 97/02 524/27 |
| 2009/0114123 | A1 | 5/2009 | Clark et al. |
| 2012/0070626 | A1* | 3/2012 | Battis ..................... B27N 3/00 428/192 |
| 2012/0083554 | A1 | 4/2012 | Combs et al. |
| 2013/0131223 | A1 | 5/2013 | Bouguettaya et al. |
| 2013/0131231 | A1* | 5/2013 | Bouguettaya .......... C09J 131/04 524/72 |
| 2018/0319135 | A1 | 11/2018 | Barzegari et al. |

FOREIGN PATENT DOCUMENTS

| | | | |
|---|---|---|---|
| WO | WO2015196134 | A1 | 12/2015 |
| WO | WO2016022951 | A1 | 2/2016 |

\* cited by examiner

ARTICLES MADE FROM LIPOPHILIC-RICH CELLULOSIC MATERIAL AND METHODS THEREFOR

CROSS-REFERENCE TO RELATED APPLICATIONS AND CLAIM TO PRIORITY

This application claims priority to U.S. Provisional Patent Application No. 62/582,560, filed Nov. 7, 2017, which is incorporated herein by reference.

FIELD OF THE INVENTION

This invention relates to systems and techniques for manufacturing articles from lipophilic-rich cellulosic materials, a tackifier, and a binder resin, and related processes of making and using the cellulosic articles. In particularly exemplary embodiments, the manufactured articles are door skins, sometimes known as door facings, and doors made from the door skins.

BACKGROUND OF THE INVENTION

Man-made consolidated cellulosic articles, such as fiberboard, hardboard, medium density fiberboard and the like, can be press molded or embossed to have three-dimensional shapes and/or various design and structural features found in natural wood. The types of useful consolidated cellulosic articles are referred to by terms such as: (a) fiberboards such as hardboard (e.g., low-density or high-density hardboard), soft board, medium-density fiberboard (MDF), high-density fiberboard (HDF); and (b) chipboards such as particleboard and medium-density particleboard. Such composite articles can be used as door skins (door facings), columns, floors, floor underlayment, roof sheathings, ceilings, walls, wall coverings, wainscots, partition systems, doors, and stairs in the construction of homes, offices, and other types of buildings, as well as furniture components, such as chairs, tables, countertops, cabinets, and cabinet doors, and other uses, such as bulletin boards, for example.

Various processes can be used to produce consolidated cellulosic articles, including wet-felted/wet press or "wet processes"; dry-felted/dry-pressed or "dry" processes; and wet-felted/dry-pressed or "wet-dry" processes. Such processes are discussed in further detail in U.S. Pat. No. 6,524,504, the disclosure of which is incorporated herein by reference.

Conventionally, consolidated cellulosic articles typically include a formaldehyde based binder, such as phenol formaldehyde or urea formaldehyde, to "glue" the fibers together. Formaldehyde binders are low cost and compatible with the hydrophilic nature of cellulosic fiber, readily reacting with the high population of hydroxyl groups of cellulose, hemicellulose, and lignin components of the fiber to bind the fibers together.

Generally, wood fibers used to make cellulosic articles are hydrophilic in nature due to hydroxyl groups, which interact well with water. However, as sources for common wood fibers dwindle, alternative wood sources are considered. In certain countries, such as Malaysia, the government has emphasized the use of alternate plantation, fast-growing tree species as wood fiber sources. Some alternate sources may be less desirable due to high lipophilic (hydrophobic) components, such as pitch, fatty acid, glycerides and di/triglycerides, steryl esters, alkanol esters, wax, sterols, terpene alcohols, etc., in their fibers (high lipophilic extractive). For example, Acacia is an alternate wood fiber source. Acacia wood fiber has been undesirable in making consolidated cellulosic articles due to its high content of lipophilic components, which interfere with the efficacy of typical formaldehyde based binders. Applicant has discovered that lipophilic-rich wood fibers, such as Acacia fibers, are not compatible with commonly used binders in a typical blow-line resination process for thin MDF sheets, sometimes resulting in poor processing, such as fiber mat cracking, poor surface quality, poor coatability, and/or poor glue adhesion. Blow-line resination has a negative effect on the tackifying effect of the formaldehyde binders. Applicant has also realized that adding conventional UF resin through a blender (after a blow-line) can improve mat integrity, but results in poor board surface due to the formation of resin spots, among other defects.

Therefore, there remains a need to develop formulations and processes to enable the use of lipophilic-rich cellulosic fibers in the formation of consolidated cellulosic articles without decreasing mechanical/physical properties.

SUMMARY OF THE INVENTION

According to a first aspect of the invention, a composite article is manufactured which contains a lipophilic-rich cellulosic material, a tackifier, and a binder. The tackifier is diluted to a relatively low concentration to improve tackifier distribution on the lipophilic-rich cellulosic material. In an embodiment, the tackifier is distributed throughout the composite article. In another embodiment, the tackifier is located on the surface of the composite article.

A second aspect of the invention provides a method for making the composite article. In a first embodiment, the method comprises combining the cellulosic fiber material with a binder and a tackifier, forming a composite mat, and pressing and heating the composite mat to form the composite article. The tackifier may be added through a blender to a mixture of cellulosic fiber material and binder, preferably after the addition of the blowline binder. In a second embodiment, the method comprises combining the cellulosic fiber material with a binder, forming a composite mat, depositing a tackifier onto the surface of the composite mat, and pressing and heating the composite mat to form the composite article.

Other aspects of the invention, including methods, processes, articles, compositions, formulations, intermediates, activated fibrous materials, systems, kits, and the like which constitute part of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings:

FIGS. 2-6 are drawings of photographs taken of the described subject matters.

DETAILED DESCRIPTION OF THE PREFERRED EMBODIMENT(S)

Figure 1:
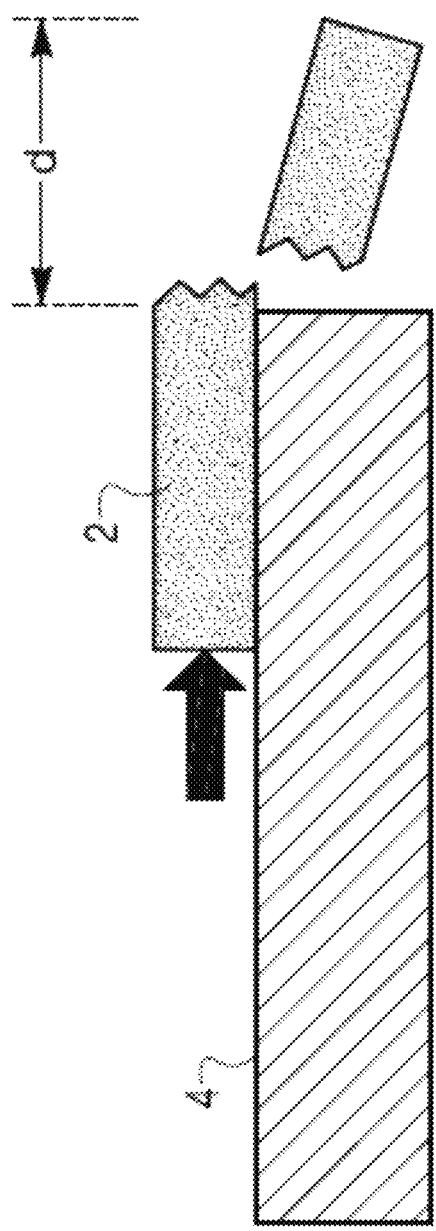
FIG. 1 is a drawing depicting a mat integrity test.

Reference will now be made in detail to exemplary embodiments and methods of the invention. It should be noted, however, that the invention in its broader aspects is not necessarily limited to the specific details, representative materials and methods, and illustrative examples shown and described in connection with the exemplary embodiments and methods.

The cellulosic articles described herein may be formed from lipophilic-rich cellulosic fiber material, which includes at least one lipophilic component. The lipophilic components can be present in the cellulosic material in an amount of at least 0.02 wt %, such as from 0.02 wt % to 8 wt % or more, based on the total weight of the cellulosic fiber material. As used herein, "lipophilic-rich" means that the lipophilic component of the cellulosic material is at least about 2 wt %. Although lipophilic component amounts lower than about 2% may be present, at least about 2%, as determined by ethanol/toluene extraction (Pinto et al., Journal of Agricultural and Food Chemistry 2005, 53, 7856-7862), is needed to be considered "lipophilic-rich" for the purposes of the present invention. Typically the acacia fibers contain lipophilic components toward the high end of the range. For purposes of the present invention, the term "lipophilic component" is to be understood as meaning that the lipophilic component is and, therefore, can be considered an impurity and/or a natural compound(s) found in the cellulosic material. Examples of lipophilic components include waxes, fatty acids, alkanols (e.g., white wax and/or long-chained OH compounds, such as $C_{24}$-$C_{28}$—OH, and/or high melting point alkanols of 90° C. or greater), hydroxy extractives, fatty alcohols, triglycerides, dyglycerides, sterols, steryl esters, phospholipids, and the like. Examples of fatty acids include fatty acids with an alkyl group of $C_4$-$C_{30}$, such as $C_{16}$-$C_{18}$ fatty acids, $C_{18}$-$C_{28}$ fatty acids, and/or $C_{20}$-$C_{26}$ fatty acids. The fatty acid can be saturated or unsaturated. A portion or all of the fatty acids can be bound or attached to other molecules, such as triglycerides or phospholipids. Other examples include tetradecanoic (myristic, $C_{14}$); hexadecanoic (palmitic, $C_{16}$); 9,12-octadecadienoic (linoleic, $C_{18}$); 7-octadecadienoic ($C_{18}$); heptadecanoic (margaric, $C_{17}$) or octadecanoic (stearic, $C_{18}$); docosanoic (behinic, $C_{22}$); tetracosanoic (lignoceric, $C_{24}$); hexacosanoic (cerotic, $C_{26}$); and/or pentadecanoic ($C_{25}$). Another way to consider this extractive content is as a) the total unsaponifiable content (e.g., content of alkanols and sterols, and steryl esters); and b) the total fatty acids content. The lipophilic cellulosic material may include Acacia wood, Eucalytus wood, cypress wood, rice, wheat as annual fibers, or combinations thereof.

The lipophilic-rich cellulosic fiber material may be mixed with non-lipophilic cellulosic fiber material (or common cellulosic material). The common cellulosic material may include cellulosic material derived from a lignocellulosic material or biomass. Lignocellulose is composed of carbohydrate polymers (cellulose, hemicellulose) and lignin, which is an aromatic polymer, that form the structure of plant cell walls. Preferably, the selected lingocellulose material is hardwood and/or softwood. Suitable species of softwood include, e.g., redwood, spruce, hemlock; and hardwood include, e.g., oak, cherry, maple, poplar, hickory, birch, aspen. The wood may be refined or defibrated using a standard refiner/defibrator, or may be unrefined. The wood or other lignocellulosic materials discussed herein also may contain delignified fibers, if the fiber source is from recycled waste paper. Non-wood organic cellulosic materials that may be used in combination with wood or as an alternative to wood include straw, kenaf, hemp, jute, bamboo culms, corn cobs, corn stover, other fibrous plants, and any combinations of two or more of such materials. Preferably, the more fibrous parts of such plants, such as the rinds, are used instead of the entire plants. Also, recycled materials that may be used in combination with wood and/or other cellulosic materials described above or as an alternative thereto include recycled paper, pulp, or a combination including recycled paper and pulp.

The total cellulosic material (lipophilic and non-lipophilic) may be in the form of particles, powder, fibers, chips, strands, flakes, shavings, sawdust, etc., or combinations thereof. The preferred cellulosic material is fibers, particularly wood fibers suitable for use in manufacturing fiberboard products. The average dimensions of length and diameter for wood fibers are typically 3 mm and 20-35 micrometers for softwood species, and 1 mm and 20 micrometers for hardwood species. For thermal mechanically refined wood fibers, such as used for MDF manufacturing, certain portions of fiber furnish are fiber bundles (comprised of multiple individual fibers) that may have larger dimensions. Finer fibers have smaller dimensions especially with over refining. Other sizes outside the above ranges may be used so long as the cellulosic material is suitable for press molding. The cellulosic material may be pre-processed and obtained as byproducts from wood mills or furniture plants and may be broken down to the desired size by using hammermills or knives, as in flakers. The cellulosic material may be in a natural state and/or processed, for example, thermally refined and/or treated for composite wood fiber panel products.

In particularly exemplary embodiments, the total cellulosic material includes relatively small particles, fibers, or other forms of wood. The particle or fiber size and distribution can be measured using a sieve testing device with a number of predetermined screens of different mesh sizes. It should be understood that depending on final products and their applications, a wide range of size distributions are considered to be well within the scope of the present invention.

Processing of the total cellulosic material may be performed using a dry process, a wet-dry process, or a wet process. In an exemplary embodiment, a batch dry process is used. Generally, a dry process involves conveying the cellulsoic material entrained in a gaseous or vapor stream or by using a fluidized bed. Atmospheric air may be used as the gaseous component of the fluidized bed.

The total cellulosic material may include about 20 wt % to about 100 wt % of the lipophilic-rich cellulosic material, preferably about 50 wt % to about 100 wt %, more preferably about 75 wt % to about 100 wt %. The balance of the total cellulosic material may include one or more common cellulosic materials. In a preferred embodiment, the total cellulosic material includes greater than about 25 wt % of Acacia fibers, preferably about 50 to about 100 wt %, with the balance being made up of mixed tropical hardwood.

The lipophilic-rich cellulosic material is preferably mixed with a binder and dried before being treated with the tackifier. The tackifying effect of the binder and of the tackifier is reduced through blowline addition. The present invention also contemplates the addition of the tackifier after the combination of the lipophilic-rich cellulosic material with the binder. For example, the lipophilic-rich cellulosic material may be combined with the binder prior to being treated with the tackifier. The lipophilic-rich cellulosic material may be combined with the binder and then treated with the tackier, as part of an in situ process. The binder addition can be broken into two or more steps taking place at different stages of the process, for example, to include in situ and ex situ treatment of the lipophilic-rich cellulosic material relative to the binder. For example, the binder can be added to the lipophilic cellulosic-rich material prior to the addition of the tackifier. Preferably, the lipophilic-rich cellulosic material is first mixed with the uncured binder in a blowline 2 (see FIG. 9) where the agitated lipophilic-rich cellulosic material is sprayed with the binder. The agitation of the lipophilic-rich cellulosic material in the blowline helps disperse the binder more consistently throughout the mass of the lipophilic-rich cellulosic material. Agitation may be provided by a steam driven turbulence flow system under pressure as is typical in the MDF industry.

The binder may be an isocyanate, a formaldehyde resin, a protein-based adhesive, or a combination thereof. The isocyanate component typically is a polymeric diphenylmethane diisocyanate (pMDI); however, other isocyanates may also be employed. The formaldehyde resin typically is a urea formaldehyde (UF) resin, a melamine UF (mUF) resin, a phenol formaldehyde (PF) resin, or combinations thereof, such as PUT or PmUF. The preferred binder is UF, PF, or a combination thereof, at an add rate typical in the MDF industry, 2-12 wt % based on total dry weight of the lipophilic-rich cellulosic material.

The binder and lipophilic-rich cellulosic material are then discharged into a dryer 4 (see FIG. 9), e.g. a flash tube dryer, to remove excess moisture. Preferably, the dryer 4 uses hot air to heat and remove the moisture. Upon exiting the dryer, the moisture content (MC) of the resinated lipophilic-rich cellulosic material is preferably about 4 to about 12%.

The dried lipophilic-rich cellulosic material is then further processed with a tackifier. As used herein, "dried lipophilic-rich cellulosic material" refers to the mixture of binder and lipophilic-rich cellulosic material which has been dried. In a first embodiment, the dried lipophilic-rich cellulosic material is mixed with a tackifier to form a composite mixture, comprising the cellulosic material, binder and tackifier. The tackifier is distributed throughout the mass of the composite mixture. The composite mixture may then be formed into a cellulosic mat, which is subsequently consolidated under pressure and heat to form the article of the present invention. In a second embodiment, the dried lipophilic-rich cellulosic material is formed into a mat, whose top surface is then coated with the tackifier, e.g. such as by spraying, followed by surface drying. The coated mat is then consolidated under pressure and/or heat to form the article of the present invention. Thus, the first embodiment produces an article having the tackifier distributed throughout its mass; and the second embodiment produces an article having the tackifier only on its surface.

In the first embodiment, the dried lipophilic-rich cellulosic material is then treated with a tackifier. As used herein, the term "tackifier" is used to refer to a material which improves the cohesive strength between the fibers and between the fibers and the fines, and promotes fiber entanglement. The tackifier has the attributes of making the fibers "sticky" and also causes them to become entangled together, particularly causing the chain ends to become entangled. The tackifier may be diluted, e.g., with water. It is important that the diluted tackifier, when added to the lipophilic-rich cellulosic material, sufficiently wets the lipophilic-rich cellulosic material while maintaining its tackiness. For example, when cellulosic fibers are used, the tackifier, when added to the fibers, should disperse onto the fibers and allow the fibers to adhere to each other. If the tackifier is not sufficiently diluted, its ability to disperse on the fibers is diminished, which may lead to poor or incomplete adhesion of the fibers. Without being bound to any particular theory, it is believed that the tackifier is useful for imparting tack to the composite article while in production, e.g. while in a mat form. It is believed that due to the lipophilic nature of the cellulosic material, the binder alone imparts insufficient tack to the wet composite article, e.g. mat, such that the mat can be cracked prior to completion of pressing the composite article. Preferably, the diluted tackifier has a concentration of about 5 to about 60 wt %, more preferably about 10 to about 40 wt %, and most preferably about 20 to about 40 wt %.

Tackifiers appropriate for the present invention may be, but are not limited to, 1) acrylics, such as BASF Acrodur 950L (water based solution of acrylic polymer), Dow Aquaset, such as Aquaset 400 and Aquaset 600 (water based acrylic solution polymer); 2) isocyanates: available commercially as XR28404 from Stahl; 3) polyethylene imines (PEI); 4) polyvinyl amides (PVA); 5) polyamide amines (PAA); 6) polycarbodiimides (CDI): available commercially as XR5508 from Stahl; 7) phenol formaldehyde resin (PF): available commercially as GP1692 from Georgia Pacific (GP); 8) urea formaldehyde (UF): available commercially as UF-ML01 from Hexion; 9) polyvinyl acetate (PVAc): available commercially as PVA-2360SP from IFS Chemicals; and 10) starch. The preferred tackifier is one or more acrylics, such as described in U.S. Published Patent Application Number 2013/0131223 A1 of Bouguettaya, incorporated herein by reference, more preferably, high molecular weight and high viscosity acrylic tackifiers. As used herein, "high molecular weight" means that the polymer has a weight average molecular weight (Mw) of from about 2,000 to about 3,000,000, preferably from about 20,000 to about 1,500,000, and more preferably from about 200,000 to about 650,000. In certain embodiments, the polymer has a number average molecular weight (Mn) of from about 1,000 to about 2,000,000, preferably from about 10,000 to about 1,000,000, and more preferably from about 55,000 to about 100,000. In general, viscosity is proportional to molecular weight, so higher molecular weight tackifiers tend to have higher viscosity.

In certain embodiments, the acrylic contains i) a $C_1$ to $C_{20}$ alkyl (meth)acrylate, ii) an ethylenically unsaturated carboxylic acid, iii) a vinyl aromatic group, iv) a vinyl ester of a $C_2$ to $C_{13}$ alkyl carboxylic acid ester, v) a $C_2$ to $C_8$ hydroxyalkyl (meth)acrylate, vi) an ethylenically unsaturated nitrile, vii) an $\alpha,\beta$-ethylenically unsaturated amide-group-containing compound, viii) a reactive vinyl cross-linker, ix) combinations thereof, or x) reaction products thereof. The $C_1$ to $C_{20}$ alkyl (meth)acrylate can be methyl (meth)acrylate, ethyl (meth)acrylate, propyl (meth)acrylate, n-butyl (meth)acrylate, isobutyl (meth)acrylate, t-butyl (meth)acrylate, pentyl (eth)acrylate, hexyl (meth)acrylate, cyclohexyl (meth)acrylate, benzyl (meth)acrylate, 2-ethylhexyl (meth)acrylate, heptyl (meth)acrylate, n-octyl (meth)acrylate, nonyl (meth) acrylate, decyl (meth)acrylate, undecyl (meth)acrylate, dodecyl (meth)acrylate, tridecyl (meth)acrylate, lauryl (meth)acrylate, stearyl (meth)acrylate, isobornyl (meth) acrylate, nobornyl (meth)acrylate, 4-tertbutylcyclohexyl (meth)acrylate, 3,3,5-trimethylcyclohexyl (meth)acrylate, dimethyl maleate, n-butyl maleate, propylene glycol (meth) acrylate, carbodiimide (meth)acrylate, t-butylaminoethyl (meth)acrylate, 2-t-butylaminoethyl (meth)acrylate, N,N-dimethylaminoethyl (meth)acrylate, or combinations thereof.

In certain embodiments, UF and/or PF may be used as a tackifier as well as a binder. When used as a tackifier, however, the UF or PF is more diluted (and thus, has a lower viscosity) than the same used as a binder. For example, when used as a binder, the solid content of UF is about 60 wt % to about 65 wt %, but when used as a tackifier, the solid content is less than 50 wt %.

Figure 9:
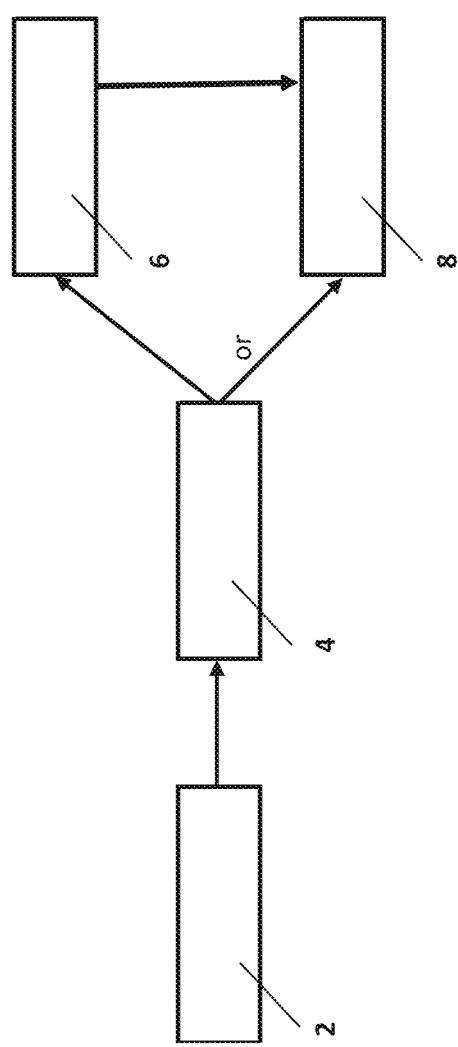
FIG. 9 is a schematic of a system for resinating the cellulosic fibers.

During the treatment process of the first embodiment, the tackifier is preferably added to the dried lipophilic-rich cellulosic material in a blender 6 (see FIG. 9). The tackifier may be diluted before being added to the blender or mixed with the diluent in-situ in the blender 6. The dried lipophilic-rich cellulosic material may be introduced to the blender 6 at the same time as or before the tackifier. Preferably, the tackifier is added to the blender 6 in an amount of about 0.3 to about 2% based on the weight of the lipophilic-rich cellulosic material (dried basis), more preferably about 0.4 to about 1%. The tackifier is sprayed onto the fiber in the blender where the fiber and tackifier droplets intermingle in turbulent spin-flow conditions. The blender may be a blender suitable for batch processing, although the present invention also contemplates a continuous process with tackifier being introduced into a flowing turbulent stream of lipophilic-rich cellulosic material.

In the first embodiment, the composite mixture comprising the cellulosic material, binder and tackifier may then be formed into a composite article by first forming the composite mixture into a cellulosic mat, and then consolidating the cellulosic mat under pressure and/or heat as in a typical MDF manufacturing process.

In the second embodiment, the cellulosic mat is formed from the dried lipophilic-rich cellulosic material and sent to the forming line 8 (see FIG. 9) where the tackifier is coated, e.g. such as sprayed, on the top surface of the cellulosic mat before consolidation under pressure and/or heat. The method of the second embodiment eliminates the need for the blender 6. In that case, it is possible to proceed directly to the forming line 8 from the drier 4.

The forming processes described, for example, in U.S. Pat. No. 5,543,234 to Lynch et al. and U.S. Pat. No. 4,726,881 to Schultz may be used for the present invention. The mat may include one or more layers of the composite mixture, and be made according to methods known to those skilled in the art. A "dry" production process, i.e. a typical MDF manufacturing process, is preferred for the invention, but wet or wet/dry processes can also be considered. The composite article is formed by consolidating the mat in a press, typically under heat and pressure, according to methods known to those skilled in the art. The composite mixture may be randomly formed into a mat by air blowing one or more layers of the composite onto a support member. The mat, typically having a moisture content of less than or equal to about thirty weight percent (30% by total weight), and preferably 4-12 wt %, is then pressed under heat and pressure to cure the resin and to compress the mat into an integral consolidated structure. For example, typical pressing conditions for thin MDF door skins (about ⅛" in thickness) may include press temperature of about 270-350° F. with UF resin and fiber moisture content of about 10-12%, and 380-420° F. with PF resin and fiber moisture content of about 4-6%. Exemplary press cycle times may be about 45-70 seconds.

During pressing, one or more reactions may take place between the binder and the cellulosic material, the tackifier and the cellulosic material, and/or the binder and the cellulosic material and/or combination of all three. For example, condensation reactions between carboxlic acid (from the tackifier), hydroxyl (from the cellulosic material) and methylol groups (from the binder) may take place during hot pressing. Depending on the chemistry of the binder and the tackifier the tackifier may be reactive or inert with respect to the binder component and/or the cellulosic material. If bonding does occur between the tackifier and other components of the composite article, it may be physical and/or chemical bonding. Certain tackifiers may impart a degree of hydrogen bonding with the cellulosic material.

The pressed composite articles contain cellulosic fibers which contain lipophilic components. However, upon treatment with the tackifier, the lipophilic-rich cellulosic fibers may be used to form composite articles which possess physical and mechanical properties similar to or better than those conventionally made from common cellulosic fibers, including no fiber mat cracking prior to pressing, high surface quality, excellent coatability, and/or excellent glue adhesion of the composite panels. The composite articles produced may be (a) fiberboard, such as hardboard (e.g., low-density or high-density hardboard), soft board, and medium-density fiberboard ("MDF"); and (b) chipboard, such as particleboard, medium-density particleboard. Most preferably, the composite articles are door skins (thin MDF), such as typically used to make solid core or hollow core doors.

Without further description, it is believed that one of ordinary skill in the art can, using the preceding description and the following illustrative examples, make and utilize the articles of the present invention and practice the claimed methods. Resination and addition of tackifier were accomplished during initial testing by spraying onto air fluidized fiber using a lab scale blender consisting of a motor driven fan in the bottom of a 22-liter stainless steel beaker. The treated fiber with tackifier was formed into 8"×8" fiber mats for the mat integrity test. It should be understood that the invention is not to be limited to the specific conditions or details described in the examples.

EXAMPLE 1

Mat Integrity Test for Articles Made by the First Embodiment

Acacia fibers (moisture content (MC) of 14-16%) were resinated with UF binder and dried using an IR oven to a moisture content of 7-10%. If used, a tackifier was then added to the dried fibers. 100 g of fibers were then used to make an 8"×8" loose fiber mat and pressed to a stop with a thickness of 12.7 mm at room conditions and then the pressure was immediately removed. Mats made with different tackifiers at different solids content and with different add rates were made and tested.

The compressed mat was subjected to a mat integrity test as illustrated in FIG. 1, where the compressed mat 2 was slid along and beyond a flat surface 4. The distance d where the mat broke off is proportional to the integrity of the mat, i.e., the larger the distance d, the higher the mat integrity.

Mat spring back of the compressed mat (final mat height after compression) was also measured by a caliper.

Table 1 shows the results of the mat spring back and mat integrity tests of the following compressed mat samples:

Sample 1: Acacia fibers were resinated with 10% UF binder (with 59% solids), dried in a laboratory IR oven. UF (as tackifier) at a 2% add rate (based on dried fiber) was then added to the fibers. Resination and tackifier additions were made using a laboratory blender described above. A compressed mat was formed as described above. Target moisture content of the mat was 9-11 percent. Sample 1 was a control sample used to observe the results where the invention was not implemented.

Sample 2: The same as Sample 1 except that the tackifier was Acrodur 950L with 30% solids.

Sample 3: The same as Sample 1 except that the tackifier was Dow Chemical-Aquaset 400 with 30% solids.

Sample 4: The same as Sample 1 except that the tackifier was Stahl-CDI 5508 with 30% solids.

Sample 5: The same as Sample 1 except that the tackifier was PEI with 30% solids.

Sample 6: The same as Sample 1 except that the tackifier was IFS-PVAc 2360SP with 30% solids.

Sample 7: Acacia fibers were resinated with 10% UF binder and 2% Acrodur 950L with 30% solids (tackifier) and dried in an IR oven (no blender mixing was effected). Sample 7 was intended to simulate the addition of the binder and the tackifier at the same time in the blow line.

TABLE 1

| Sample | Mat spring back (mm) | Mat integrity (in.) |
|---|---|---|
| 1 | 32.5 | 4.50 |
| 2 | 31.1 | 5.25 |
| 3 | 31.0 | 5.50 |
| 4 | 31.3 | 4.50 |
| 5 | 28.7 | 4.25 |
| 6 | 32.5 | 4.00 |
| 7 | 32.0 | 3.75 |

The following observations are evident from Table 1:

1) Tackifiers Acrodur 950L and Aquaset 400 significantly improved mat integrity when compared to control Sample 1.

2) Tackifiers CDI and PEI made fibers very tacky (due to observed fiber agglomeration) but mat integrity values did not change much when compared to control Sample 1.

3) It appears that a balance of fiber entanglement (resulting from even dispersion of tackifier on the fibers) and tackiness is needed to achieve desired mat integrity (see also Example 3 below).

4) Addition of the tackifier before IR drying did not improve mat integrity (see Sample 7).

EXAMPLE 2

Mat Integrity Test for Articles Made by the Second Embodiment

Acacia fibers (moisture content (MC) of 14-16%) were resinated with UF binder and dried using an IR oven to a moisture content of 7-10%. 100 g of fibers were then used to make an 8"×8" loose fiber mat and pressed to a stop with a thickness of 12.7 mm at room conditions and then the pressure was immediately removed. The tackifier was sprayed (with fine droplets) onto the top surface of the compressed mat and then mat integrity was evaluated before and after drying in the oven for 10 min at 140 F.

Sample 8: The tackifier Acrodur 950L was sprayed on top of the compressed mat.

Sample 9: The same as Sample 8 except that the fiber mat was dried in the oven.

Sample 10: The tackifier UF (as tackifier) was sprayed on top of the compressed mat.

Sample 11: The same as Sample 10 except that the fiber mat dried in the oven.

TABLE 2

| Sample | Mat spring back (mm) | Mat integrity (in.) |
|---|---|---|
| 8 | 30.7 | 3.5 |
| 9 | 30.7 | >6.5 |
| 10 | 31 | 4 |
| 11 | 31 | >6.5 |

From Table 2, surface coating of Acrodur 950L or UF as tackifier on the fiber mat and then drying of wet top layer resulted in significantly improved the mat integrity (see Samples 9 and 11 in Table 2).

EXAMPLE 3

Tack Turbulence Test

The tackifier was added to UF resinated fiber in the manner described in Example 1. 30 g of the dried fibers were added to a pan and shaken for 10 min. using the agitation of a standard lab sift device. The amount of fiber agglomeration in the pan was photographed in both top and bottom sides (FIGS. 2-4) and visually evaluated.

Several samples were made and evaluated as follows:

Samples A, B, C and D) UF tackified fibers prepared, as described in the preceeding paragraph, at 11.5% (Sample A), 14.7% (Sample B), and 17.6% (Sample C) moisture content (MC) by changing the solids content of the tackifier from 60% to 30% and 15%. Sample A was further dried, before tackifier addition, to lower the moisture content to 9.3% (shown as sample D in FIG. 2).

Sample E) Acrylic (Acrodur 950L) tackified fibers prepared as described above at 14.2% moisture.

Sample F) Acrylic (Aquaset 400) tackified fibers prepared as described above at 13.3% moisture.

Figure 3:
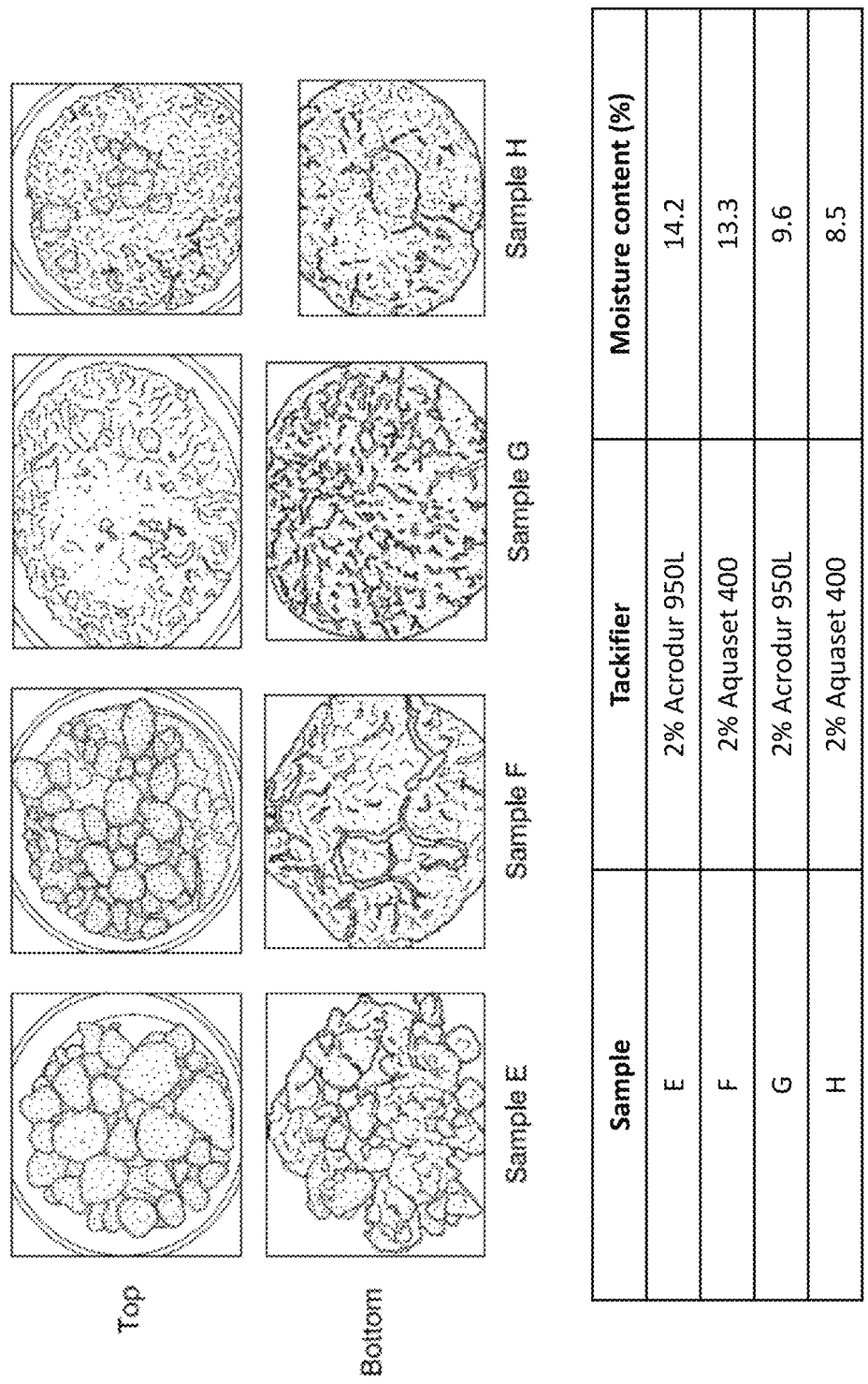
FIG. 3 contains drawings showing the top and bottom views of a pan for Samples E, F, G and H.

Sample G) Sample E was further dried, before tackifier addition, to lower the moisture content to 9.6% (shown as sample G in FIG. 3).

Sample H) Sample F was further dried, before tackifier addition, to lower the moisture content to 8.5% (shown Sample H in FIG. 3).

Sample I) CDI tackified fibers prepared as described above at 9.7% moisture.

Sample J) PEI tackified fibers prepared as described above at 8.5% moisture.

Figure 2:
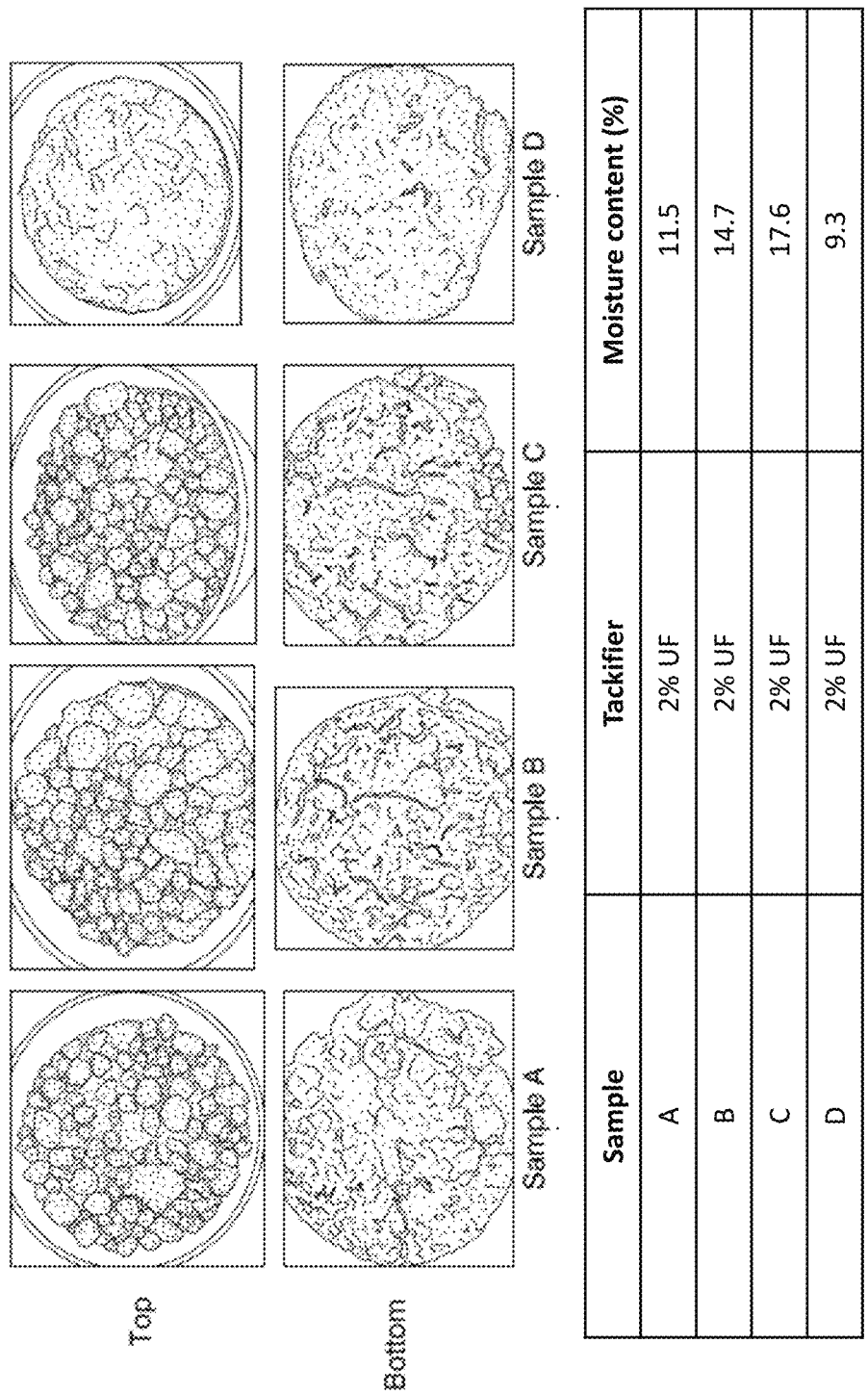
FIG. 2 contains drawings showing the top and bottom views of a pan for Samples A, B, C and D.

FIG. 2 shows drawings of the top and bottom views of the pan for Samples A-D. Because the fibers agglomerate or clump, the sizes of the agglomerations are indicative of the clumping achieved with the various samples. The larger clumps in the drawings indicate higher fiber agglomeration/cold tack than the smaller clumps. It is apparent from FIG. 2 that an increase in moisture content increases fiber agglomeration (compare Samples A, B, and C, and Sample D).

Figure 7:
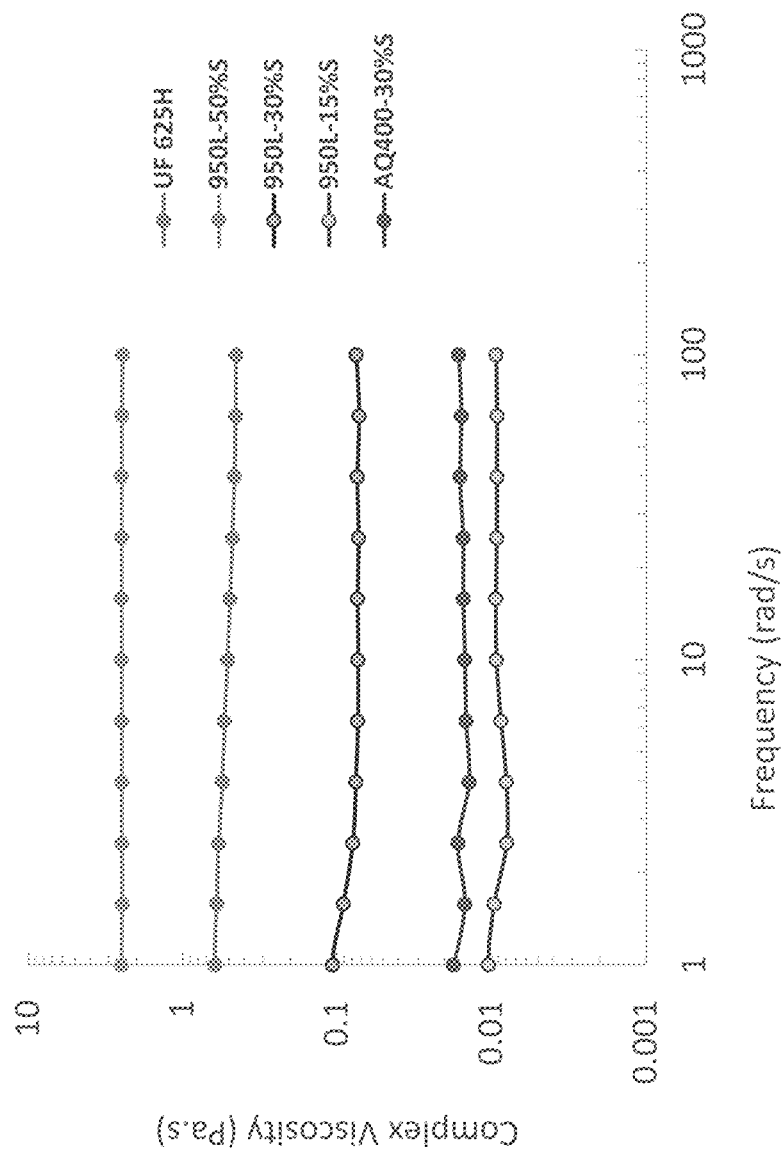
FIG. 7 is a graph illustrating complex viscosity vs. time for different resins at different dilutions.

FIG. 3 shows drawings of the top and bottom views of the pan for Samples E, F, G and H. The samples were made to compare different acrylic tackifiers and MC. It is apparent from FIG. 3 that 1) lower MC reduces fiber agglomeration for both Acrodur 950L (compare Samples E and G) and Aquaset 400 (compare Samples F and H); 2) lower amounts of loose fibers or higher agglomeration observed for the Acrodur 950L (Samples D and E) may be related to higher tackiness of this resin in comparison with UF resin; 3) lower amounts of fines is evident for the Acrodur 950L Sample D in comparison with Samples A and B; and 4) higher molecular weight and/or higher viscosity of Acrodur 950L (see FIG. 7 which shows viscosities for Acrodur 950L and Aquaset 400 (AQ400)) produces more agglomeration in comparison with Aquaset 400.

Figure 4:
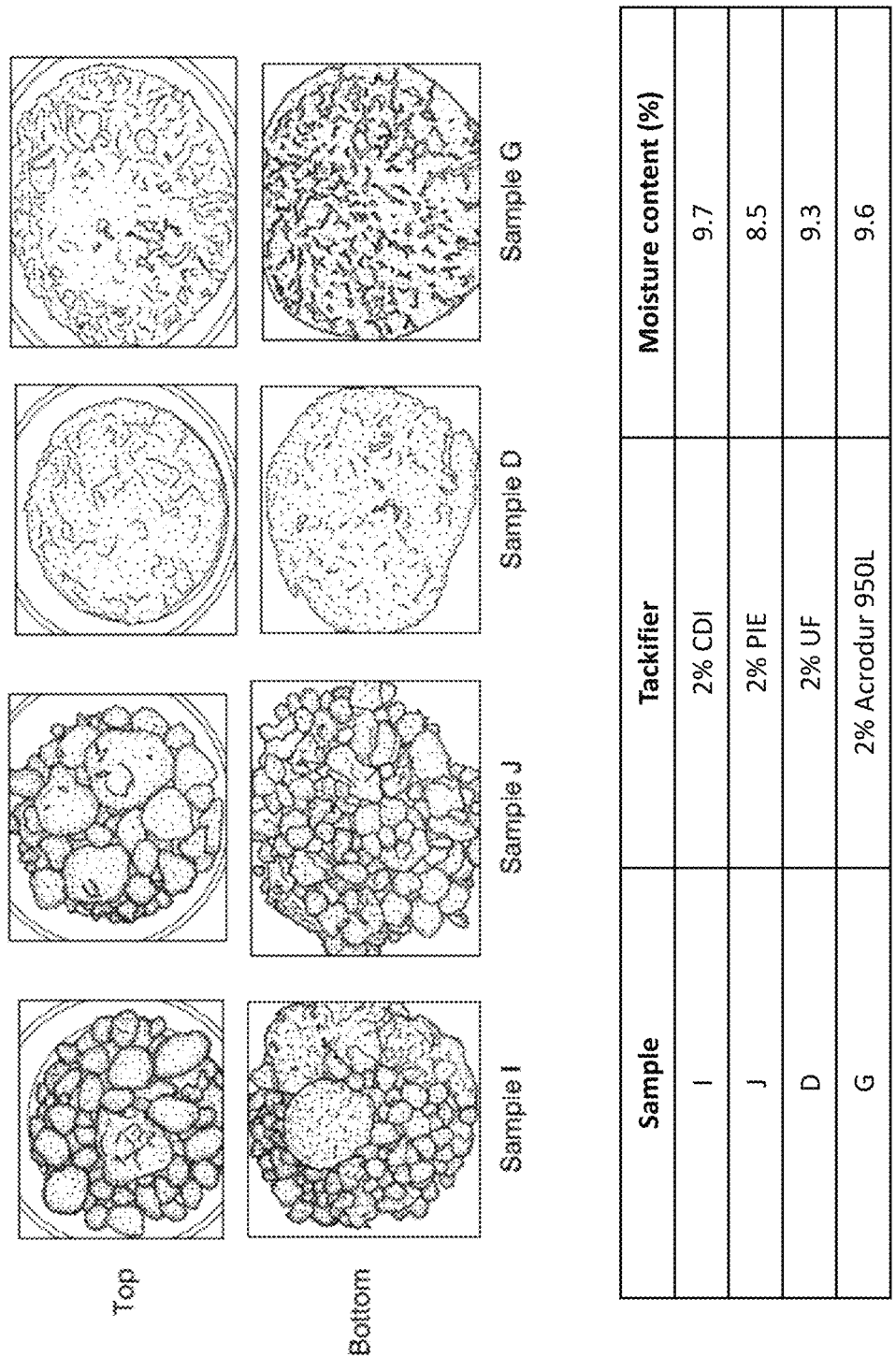
FIG. 4 contains drawings showing the top and bottom views of a pan for Samples I, J, D and G.

FIG. 4 shows drawings of the top and bottom views of the pan for Samples I-J, D, and G. It is apparent from FIG. 4 that CDI (Sample I) and PEI (Sample J) have high tackiness compared to Acrodur 950L (Sample G) even at low MC.

EXAMPLE 4

Mat Surface Evaluation

Mats were made in accordance to the method described in Example 1. The following mat samples were made:

Sample i) 2% UF tackified fiber mat prepared at 8.5% moisture.

Sample ii) 2% Acrodur 950L tackified fiber mat prepared at 9.6% moisture.

Sample iii) 2% PEI tackified fiber mat prepared at 8.5% moisture.

Figure 5:
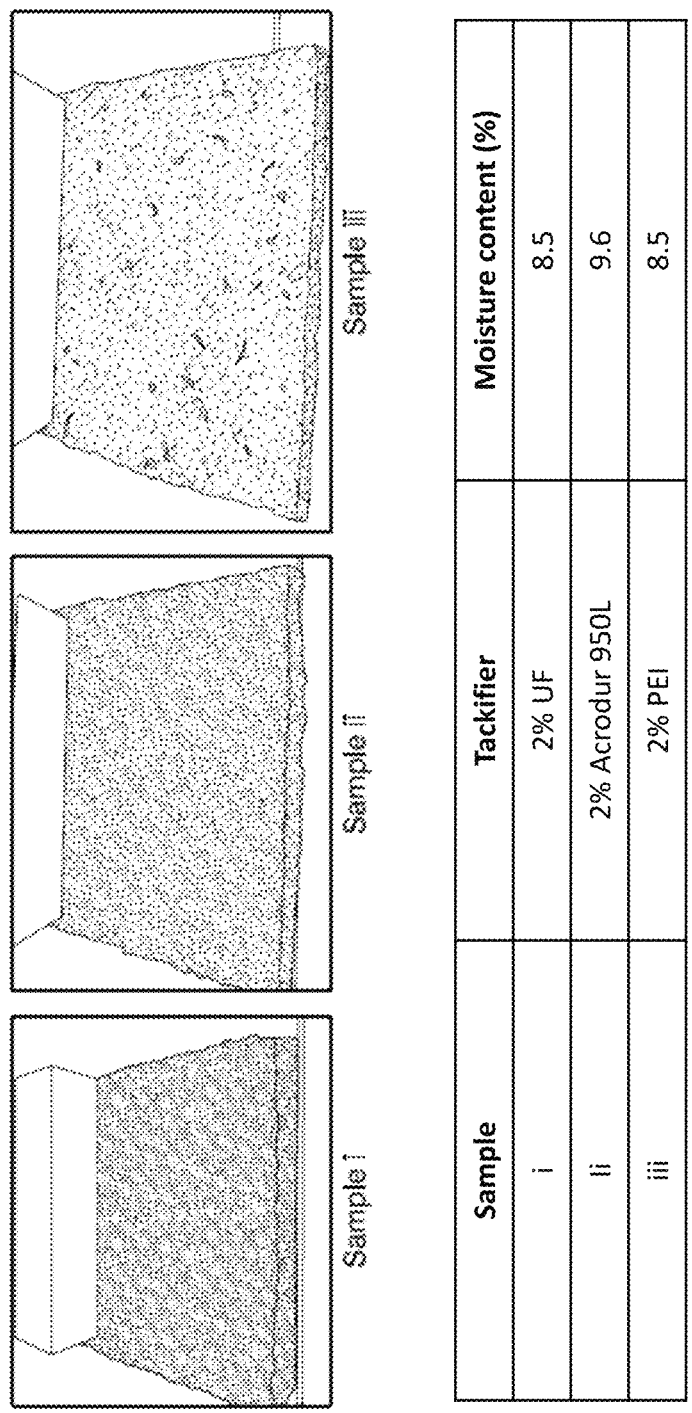
FIG. 5 contains drawings showing the mat surfaces for Samples i-iii.

FIG. 5 shows drawings of the mats made in Samples i-iii. It is apparent from FIG. 5 that 2% UF and Acrodur 950L tackifiers result in a relatively smooth mat surface (Samples i and ii, respectively), while the mat surface made with 2% PEI (Sample iii) appears relatively rough. Overall, Samples i, ii and iii show that the visual smoothness of the mat surface may be correlated with high fiber to fiber entanglement (cf. FIG. 4). Even though PEI is tackier than Acrodur 950L, it results in poor fiber entanglement and consequently lower mat integrity than Acrodur 950L (cf. FIG. 4).

Figure 6:
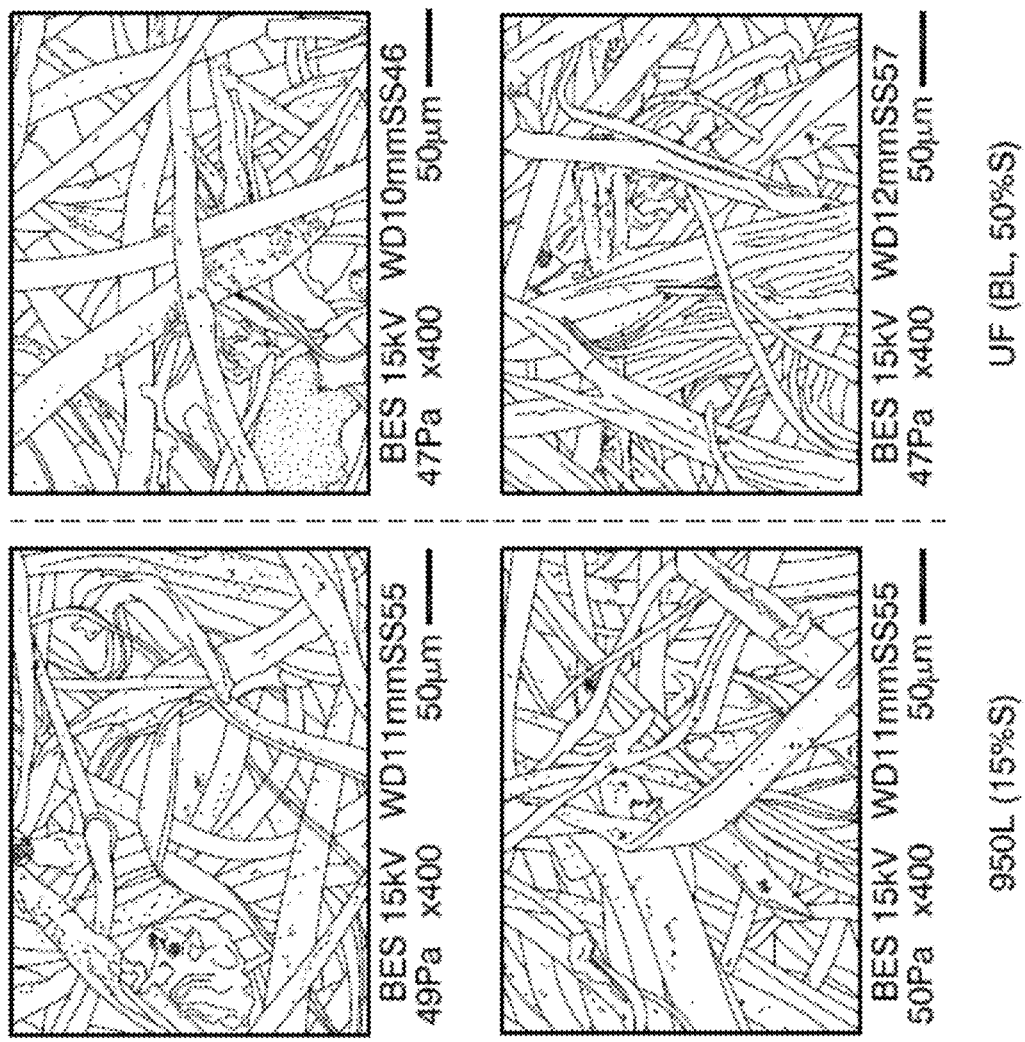
FIG. 6 are drawings of electron micrographs of board surfaces.

FIG. 6 shows drawings of scanning electron micrographs (SEM) of mats formed with barium sulfate labeled Acrodur 950L and UF tackifiers. The black dots (barium sulfate) on the SEM show areas rich in resins. It is apparent from FIG. 6 that resin distribution on the fibers is much better with Acrodur 950L when compared to UF resin with high solids content (50%) as a control. Moreover, Acrodur 950L can be diluted to a much lower solids content than UF. The increased dilution assists in distribution of the resin onto the fibers, which reduces resin spot issues on board surfaces. Dilution of the tackifiers reduces their viscosity (FIG. 7) which significantly improves their distribution on the fibers.

EXAMPLE 5

Mechanical Performance

Lab test boards were made using a lab press and pressing at 350° F. for 1 minute at about 600-700 psi. Portions of the fiber mats made for the mat integrity test (described in Example 1) were used to make the laboratory test boards, which were subjected to tensile testing. A board specimen having dimensions of 5 cm (length)×1 cm (width)×about 0.3 cm (thickness) was pulled apart in a universal mechanical testing machine. The tensile stress at breakage of the specimen was recorded. Board samples were made as follows:

Sample a) Tackified fibers prepared as described in Example 1 using 2% UF tackifier at 50% solids.

Sample b) Tackified fibers prepared as described in Example 1 using 2% Aquaset 400 tackifier at 30% solids.

Sample c) Tackified fibers prepared as described in Example 1 using 2% Acrodur 950L tackifier at 30% solids.

Sample d) Tackified fibers prepared as described in Example 1 using 1.5% Acrodur 950L tackifier at 15% solids.

Sample e) Tackified fibers prepared as described in Example 1 using 1% Acrodur 950L tackifier at 15% solids.

Figure 8:
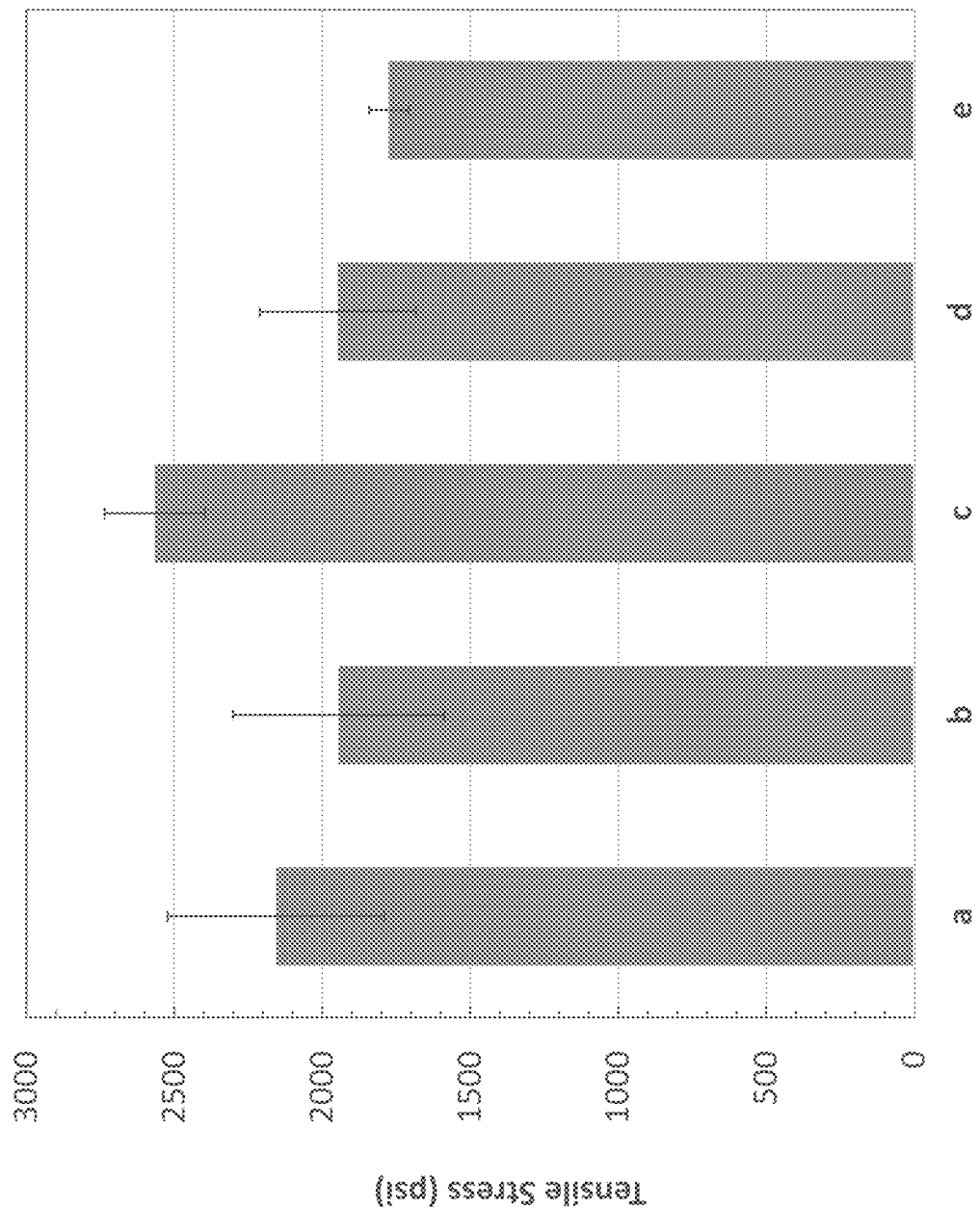
FIG. 8 is a graph illustrating the tensile stresses of board samples a-e.

FIG. 8 shows the tensile stresses of board samples a-e. It is apparent from FIG. 8 that resinating Acacia fibers with 2% Acrodur 950L/30% solids (Sample e) improves the mechanical properties of fiberboard when compared with UF resin (Sample a) as a control. The addition of the tackifier Acrodur 950L (sample c) did not reduce the mechanical integrity as compared with the control board (sample a). In other words, there is a good bonding interaction among all three components, the lipophilic cellulosic fiber, the conventional binder, and the tackifier.

EXAMPLE 6

Full Size Door Skin Testing

The effect of two tackifiers, Aquaset 400 and Acrodur 950L, with various add rates was investigated to identify and eliminate mat cracking and resin spot defects. Mat cracking levels, noted as a percentage, and appearance of resin spots on the full size door skins are reported in Table 3. The Aquaset 400 tackifier was added to the mixed acacia fibers and binder. Addition of Aquaset 400 with 0.5%, 0.75%, 1% and 1.7% add rates eliminated successfully the mat cracking and resin spots on the door skins. Addition of Acrodur 950L with 1%, 1.25% and 1.7% add rates eliminated the mat cracking but did not reduce the resin spots on the door skins.

TABLE 3

| Tackifier | Add Rate, (%) | Mat spring back, (mm) | Mat Cracking % | Appearance of resin spots |
|---|---|---|---|---|
| UF- 625BL | 1.70 | 33 | 0 | Resin spots |
| Aquaset400 | 1.70 | 31 | 0 | No resin spots |
| Aquaset400 | 1.00 | 33 | 0 | No resin spots |
| Aquaset400 | 0.75 | 32 | 0 | No resin spots |
| Aquaset400 | 0.50 | 30 | 0 | No resin spots |
| Acrodur 950L | 1.70 | 34 | 0 | Resin spots |
| Acrodur 950L | 1.25 | 34 | 0 | Resin spots |
| Acrodur 950L | 1.00 | 31 | 0 | Resin spots |

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A composite article comprising a lipophilic-rich cellulosic material (LCM), a binder, and a tackifier, wherein the LCM contains at least about 2 wt % of a lipophilic component.

2. The composite article of claim 1, wherein the LCM comprises Acacia wood, Eucalytus wood, cypress wood, rice straws, wheat straws as annual fibers, or combinations thereof.

3. The composite article of claim 1, wherein the binder is urea formaldehyde (UF), phenol formaldehyde (PF), melamine urea formaldehyde (mUF), polymethylene poly(phenyl isocyanates) (pMDI), or combinations thereof.

4. The composite article of claim 1, wherein the tackifier is an acrylic polymer, an isocyante, a polyethylene imine, a polyamide amine, a polycarbodiimide, a phenol formaldehyde resin, a polyvinyl acetate, a starch, or combinations thereof.

5. The composite article of claim 4, wherein the tackifier is a high molecular weight acrylic polymer.

6. The composite article of claim 5, wherein the acrylic polymer contains i) a $C_1$ to $C_{20}$ alkyl (meth)acrylate, ii) an ethylenically unsaturated carboxylic acid, iii) a vinyl aromatic group, iv) a vinyl ester of a $C_2$ to $C_{13}$ alkyl carboxylic acid ester, v) a $C_2$ to $C_8$ hydroxyalkyl (meth)acrylate, vi) an ethylenically unsaturated nitrile, vii) an $\alpha,\beta$-ethylenically unsaturated amide-group-containing compound, viii) a reactive vinyl cross-linker, ix) combinations thereof, or x) reaction products thereof.

7. The composite article of claim 6, wherein the $C_1$ to $C_{20}$ alkyl (meth)acrylate is methyl (meth)acrylate, ethyl (meth)acrylate, propyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, benzyl (meth)acrylate, 2-ethylhexyl (meth)acrylate, heptyl (meth)acrylate, n-octyl (meth)acrylate, nonyl (meth)acrylate, decyl (meth)acrylate, undecyl (meth)acrylate, dodecyl (meth)acrylate, tridecyl (meth)acrylate, lauryl (meth)acrylate, stearyl (meth)acrylate, isobornyl (meth)acrylate, norbornyl (meth)acrylate, 4-tertbutylcyclohexyl (meth)acrylate, 3,3,5-trimethylcyclohexyl (meth)acrylate, dimethyl maleate, n-butyl maleate, propylene glycol (meth)acrylate, carbodiimide (meth)acrylate, t-butylaminoethyl (meth)acrylate, 2-t-butylaminoethyl (meth)acrylate, N,N-dimethylaminoethyl (meth)acrylate, or combinations thereof.

8. The composite article of claim 1, wherein the tackifier is coated onto the surface of the article.

9. The composite article of claim 1, wherein the tackifier is distributed throughout the mass of the article.

10. The composite article of claim 1, further comprising non-lipophilic cellulosic material, wherein the non-lipophilic cellulosic material and the lipophilic cellulosic material form a total cellulosic material.

11. The composite article of claim 10, wherein the total cellulosic material comprises about 20 wt % to about 100 wt % of the LCM base on the total weight of the total cellulosic material.

12. The composite article of claim 10, wherein the total cellulosic material comprises more than 25 wt % of Acacia fibers, with the balance being made up of mixed tropical hardwood.

13. The composite article of claim 1, wherein the ratio of the tackifier to the LCM is about 0.3 to about 2 wt %, and the ratio of the binder to the LCM is about 2 to about 12 wt %.

14. The composite article of claim 1, wherein the composite article comprises about 10 to about 98 wt % of the LCM.

15. The composite article of claim 1, wherein the ratio of tackifier to the LCM is about 0.3 to about 2 wt %.

16. The composite article of claim 1, wherein the ratio of binder to LCM is about 2 to about 12 wt %.

17. The composite article of claim 1, wherein the article is a door skin.

18. A door skin comprising a lipophilic-rich cellulosic material (LCM) having at least about 2 wt % of a lipophilic component, a binder, and a tackifier, wherein the LCM is Acacia wood, Eucalytus wood, cypress wood, rice straws, wheat straws as annual fibers, or combinations thereof.

19. The door skin of claim 18, wherein the binder is urea formaldehyde (UF), phenol formaldehyde (PF), melamine urea formaldehyde (mUF), polymethylene poly(phenyl isocyanates) (pMDI), or combinations thereof.

20. The door skin of claim 19, wherein the tackifier is an acrylic polymer, an isocyante, a polyethylene imine, a polyamide amine, a polycarbodiimide, a phenol formaldehyde resin, a polyvinyl acetate, a starch, or combinations thereof.

21. The door skin of claim 18, wherein the LCM is Acacia wood.

* * * * *